US012761707B2

(12) United States Patent
Martinez-Nuevo et al.

(10) Patent No.: US 12,761,707 B2
(45) Date of Patent: Oct. 13, 2026

(54) DEVICES WITH SMART TEXTILE TOUCH SENSING CAPABILITIES

(71) Applicant: Bang & Olufsen A/S, Struer (DK)

(72) Inventors: Pablo Martinez-Nuevo, Frederiksberg (DK); Sven Ewan Shepstone, Struer (DK)

(73) Assignee: Bang & Olufsen A/S, Struer (DK)

( * ) Notice: Subject to any disclaimer, the term of this patent is extended or adjusted under 35 U.S.C. 154(b) by 10 days.

(21) Appl. No.: 18/844,374

(22) PCT Filed: Feb. 28, 2023

(86) PCT No.: PCT/US2023/014069
§ 371 (c)(1),
(2) Date: Sep. 5, 2024

(87) PCT Pub. No.: WO2023/164269
PCT Pub. Date: Aug. 31, 2023

(65) Prior Publication Data

US 2025/0165046 A1 May 22, 2025

(30) Foreign Application Priority Data

Feb. 28, 2022 (DK) ............................. PA202200154

(51) Int. Cl.
*G06F 1/16* (2006.01)
*A41D 1/00* (2018.01)
*G06F 3/0488* (2022.01)

(52) U.S. Cl.
CPC ............. *G06F 1/169* (2013.01); *A41D 1/002* (2013.01); *G06F 1/163* (2013.01); *G06F 3/0488* (2013.01)

(58) Field of Classification Search
CPC ......... A41D 1/002; G06F 1/163; G06F 1/169; G06F 3/0488
See application file for complete search history.

(56) References Cited

U.S. PATENT DOCUMENTS

| | | | | |
|---|---|---|---|---|
| 8,948,839 | B1 * | 2/2015 | Longinotti-Buitoni | A61B 5/6806 600/382 |
| 9,807,481 | B2 * | 10/2017 | O'Keeffe | H04W 4/70 |
| 10,090,119 | B2 * | 10/2018 | O'Keeffe | H04R 1/023 |
| 10,755,871 | B2 * | 8/2020 | O'Keeffe | H04W 4/023 |
| 11,206,052 | B1 * | 12/2021 | Park | H04R 27/00 |
| 11,244,795 | B2 * | 2/2022 | O'Keeffe | H04R 3/00 |
| 11,793,247 | B2 * | 10/2023 | Seyed | G06F 3/04144 |
| 11,910,171 | B2 * | 2/2024 | Dang | H03F 3/183 |
| 12,027,338 | B2 * | 7/2024 | O'Keeffe | H01H 9/0271 |

(Continued)

OTHER PUBLICATIONS

Yan, et al., "Single Fiber Enables Acoustic Fabrics via Nanometer Scale Vibrations", Nature, Mar. 16, 2022, 21 pages.

(Continued)

*Primary Examiner* — Michael Pervan

(74) *Attorney, Agent, or Firm* — Patterson + Sheridan, LLP

(57) ABSTRACT

A system can include a smart textile arranged on at least a portion of a surface of a device: and at least one processor communicatively coupled with the smart textile and configured to receive at least one signal from the smart textile related to input to the smart textile, process the at least one signal to identify at least one characteristic of the input, and based on the processing, cause at least one change related to the input.

21 Claims, 5 Drawing Sheets

(56) References Cited

U.S. PATENT DOCUMENTS

| | | | | |
|---|---|---|---|---|
| 12,101,612 | B2 * | 9/2024 | Dang | H03F 3/183 |
| 2015/0091859 | A1 | 4/2015 | Rosenberg et al. | |
| 2016/0283101 | A1 | 9/2016 | Schwesig et al. | |
| 2016/0309246 | A1 * | 10/2016 | O'Keeffe | H04W 4/70 |
| 2018/0108497 | A1 * | 4/2018 | O'Keeffe | H04W 4/21 |
| 2018/0310644 | A1 | 11/2018 | Poupyrev et al. | |
| 2019/0035567 | A1 * | 1/2019 | O'Keeffe | H04R 1/023 |
| 2020/0320412 | A1 | 10/2020 | Gillian et al. | |
| 2020/0388448 | A1 * | 12/2020 | O'Keeffe | H01H 9/0271 |
| 2021/0399754 | A1 * | 12/2021 | Park | H04R 3/12 |
| 2022/0078548 | A1 * | 3/2022 | Dang | H03G 3/3005 |
| 2022/0202112 | A1 | 6/2022 | Seyed et al. | |
| 2022/0216017 | A1 * | 7/2022 | O'Keeffe | H04W 4/023 |
| 2024/0107229 | A1 * | 3/2024 | Dang | H03F 3/181 |

OTHER PUBLICATIONS

ISR—WO issued in PCT/US2023014069 on Jun. 1, 2023, 13 pgs.

Preindl et al., "Sonoflex: Embroidered Speakers Without Permanent Magnets", UIST '20: Proceedings of the 33rd Annual ACM Symposium on User Interface Software and Technology, Oct. 20, 2020, pp. 675-685.

Extended European Search Report dated Feb. 4, 2026 for Application No. 23760773.4, 9 pages.

* cited by examiner

DEVICES WITH SMART TEXTILE TOUCH SENSING CAPABILITIES

PRIORITY CLAIM

The present application is a National Stage Phase entry of PCT Application No. PCT/US2023/014069, filed Feb. 28, 2023, which claims the benefit of Danish Provisional Patent Application No. PA 2022 00154, filed on Feb. 28, 2022, each of which are hereby fully incorporated herein by reference.

TECHNICAL FIELD

Embodiments of the present disclosure relate generally to systems and methods for devices with touch sensing capabilities and more particularly to such touch sensing capabilities provided by smart textiles incorporated into or on the devices.

BACKGROUND

Conventionally, use of tactile or touch interfaces in devices remains limited due to the traditionally rigid nature of such interfaces alongside the traditionally narrow scope of such interfaces, which generally provide information solely on a binary basis (i.e., whether touch occurs or does not occur). Therefore, use of such tactile and touch interfaces in conjunction with varied and diverse device shapes remains challenging. This issue is particularly present with wireless headphones that are designed to flexibly cater toward a user's preferred fit while also providing a high-end audio experience and simple user interface.

A number of systems and methods that use fixed pressure sensors in textiles are known. The resolution (e.g., density that a sensor can achieve) in these sensors is limited. Moreover, these pressure sensors are generally mounted in a set grid and often on a rigid surface. As such, use of these pressure sensors is limited in scope.

In medicine, skin-electrode mechanosensing structures (SEMS) can be used that exhibit high pressure resolution and spatial resolution, being capable of feeling touch and detecting weak physiological signals such as fingertip pulse under different skin conditions.

Other conventional approaches make use of capacitive sensing, which uses capacitive coupling to detect or measure conductivity. Capacitive sensing can be used in proximity, pressure/force, humidity, acceleration, position, and other types of sensing. An example of capacitive sensing is on smart or touch-sensitive screens, such as smartphones and tablets, or smart surfaces, where capacitive sensing replaces mechanical buttons.

SUMMARY

In one aspect, the present disclosure provides a system comprising a smart textile arranged on at least a portion of a surface of a device; and at least one processor communicatively coupled with the smart textile and configured to receive at least one signal from the smart textile related to input to the smart textile, process the at least one signal to identify at least one characteristic of the input, and based on the processing, cause at least one change to an operation of the device.

In another aspect, the present disclosure provides a method comprising arranging a smart textile on at least one surface of a device; coupling the smart textile to at least one processor of the device; and training the at least one processor to cause at least one change in a characteristic of the based on at least one signal received by the at least one processor from the smart textile.

In yet another aspect, the present disclosure provides a set of headphones comprising a smart textile arranged on at least a portion of the headphones; and at least one processor communicatively coupled with the smart textile and configured to receive at least one signal from the smart textile related to input to the smart textile, process the at least one signal to identify at least one characteristic of the input, and based on the processing, cause at least one change to an operation of the headphones.

In a further aspect, the present disclosure provides an audio speaker comprising a smart textile arranged on at least a portion of the audio speaker; and at least one processor communicatively coupled with the smart textile and configured to receive at least one signal from the smart textile related to input to the smart textile, process the at least one signal to identify at least one characteristic of the input, and based on the processing, cause at least one change to an operation of the audio speaker.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof can be more completely understood in consideration of the following detailed description of various embodiments in connection with the accompanying figures, in which.

Figure 1A:
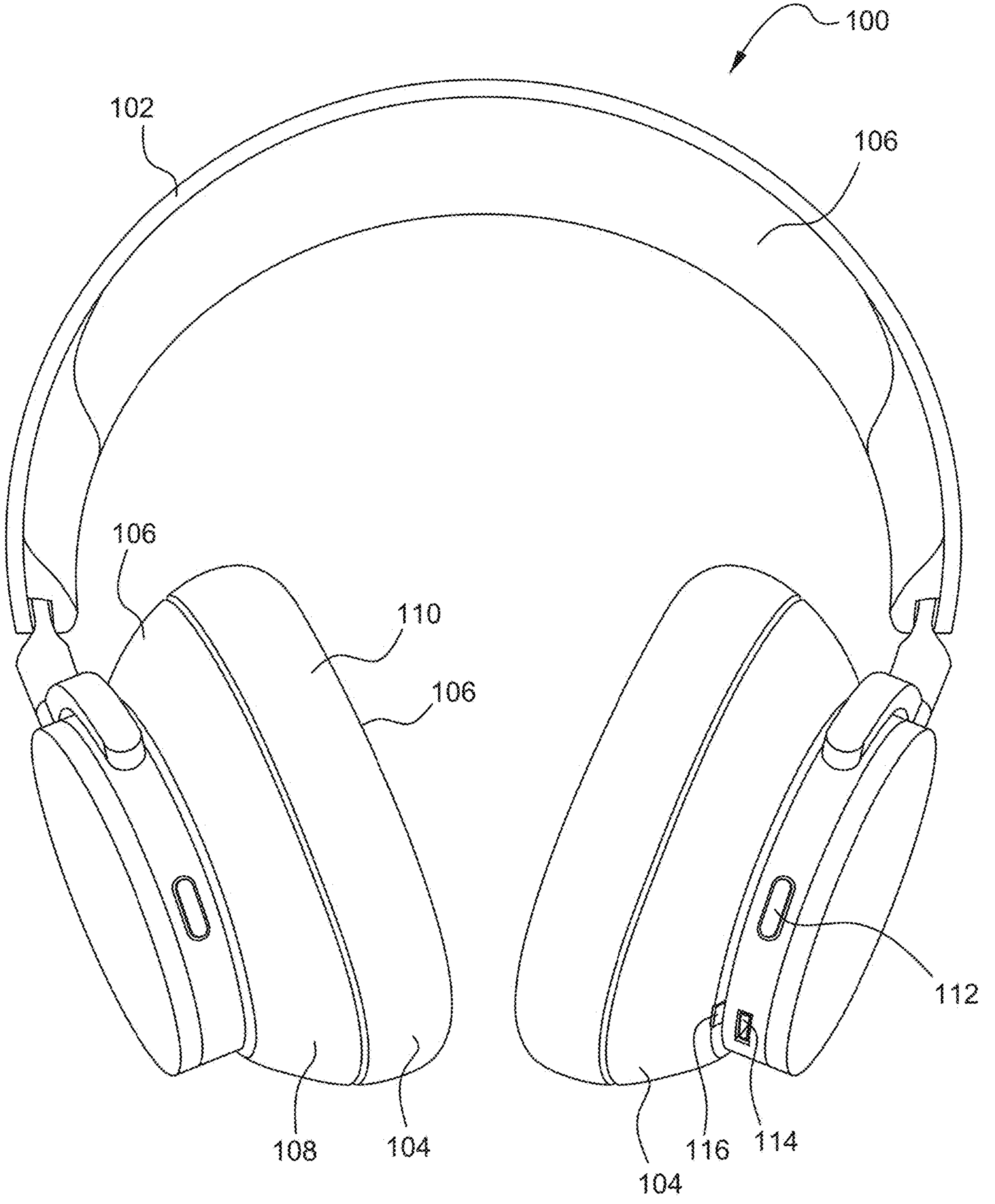
FIG. 1A is a perspective view of a set of headphones with a smart textile according to an embodiment.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

Embodiments of the present disclosure relate to devices with touch sensing capabilities provided by a smart textile. These devices can include audio and video devices, such as headphones, speakers, soundbars, sound systems, televisions, smart devices like phones, tablets and watches, and vehicles, or other devices such as remote controls, furniture, clothing and other wearable items, car seats, surfaces, and other items. Furniture can comprise furniture directed to human audiences, such as sofas, armchairs, beds, and any other furniture where a smart textile can be coupled or incorporated to the furniture. Furniture can further comprise furniture directed to pets and wild animals, including beds, automatic feeders, doors, crates, pens, gates, sofas, cages, and any other furniture where a smart textile can be coupled or incorporated to the furniture.

Textile, for purposes of the present disclosure, includes raw or processed textile, fabric, manipulated or organized fibers, and other materials that have or can be made to have one or more "smart" properties and characteristics as discussed herein. A smart textile can be incorporated into or onto these and other devices and can be used to detect an input applied, advantageously with a high resolution across the surface of the textile or material. As such, advanced touch sensing capabilities can be easily, cost-effectively, and readily incorporated into these devices.

Referring to FIG. 1A, an example set of headphones 100 is depicted. Though particular example devices (including headphones 100 in FIG. 1A and a speaker assembly 200 in FIG. 1B) are depicted and described herein, these example devices are not limiting with respect to the scope of applications of any smart textile. Headphones 100 comprise headband 102 pivotally coupling earphone units 104 at opposing ends. Headband 102 can be adjustable such that the length of headband 102 between earphone units 104 can be shortened or lengthened. Headband 102 can be fitted with a touch sensitive, or "smart," textile 106, which will be discussed in more detail herein below.

Earphone units 104 each comprise earcups 108 and ear cushions 110, which also can be covered or lined with smart textile 106. Earcups 108 house electrical components, such as speaker drivers, configured to produce sound. Earphone units 104 also can comprise at least one input element 112 as shown. Input element 112 can be one or more of buttons, sliders, touch sensitive surfaces (e.g., other than smart textile 106), and the like. Input element 112 can be configured to receive user input to control power, volume, sound proofing, and other features of headphones 100 or of connected devices such as a smartphone or the like. Input element 112 can be located anywhere on exterior headphones 100 such that input element 112 remains accessible for manual user input when worn by a user. Though input element 112 is included in the example of FIG. 1A, input element 112 can be omitted in other embodiments, particularly embodiments wherein audio systems are fully controlled by smart textile 106.

Earcups 108 can further include one or more input ports 114 configured to receive a cable, such as for charging or external audio coupling (e.g., on an airplane where BLUETOOTH or other wireless coupling is not available) and one or more indicator lights 116 configured to convey status information of headphones 100. The arrangement of input element 112, input ports 114, and indicator lights 116 can vary on or between earcups 108. Still other physical or wireless inputs can be included in other examples, such as Qi wireless charging, BLUETOOTH, and others to facilitate interaction with headphones 100.

Figure 1B:
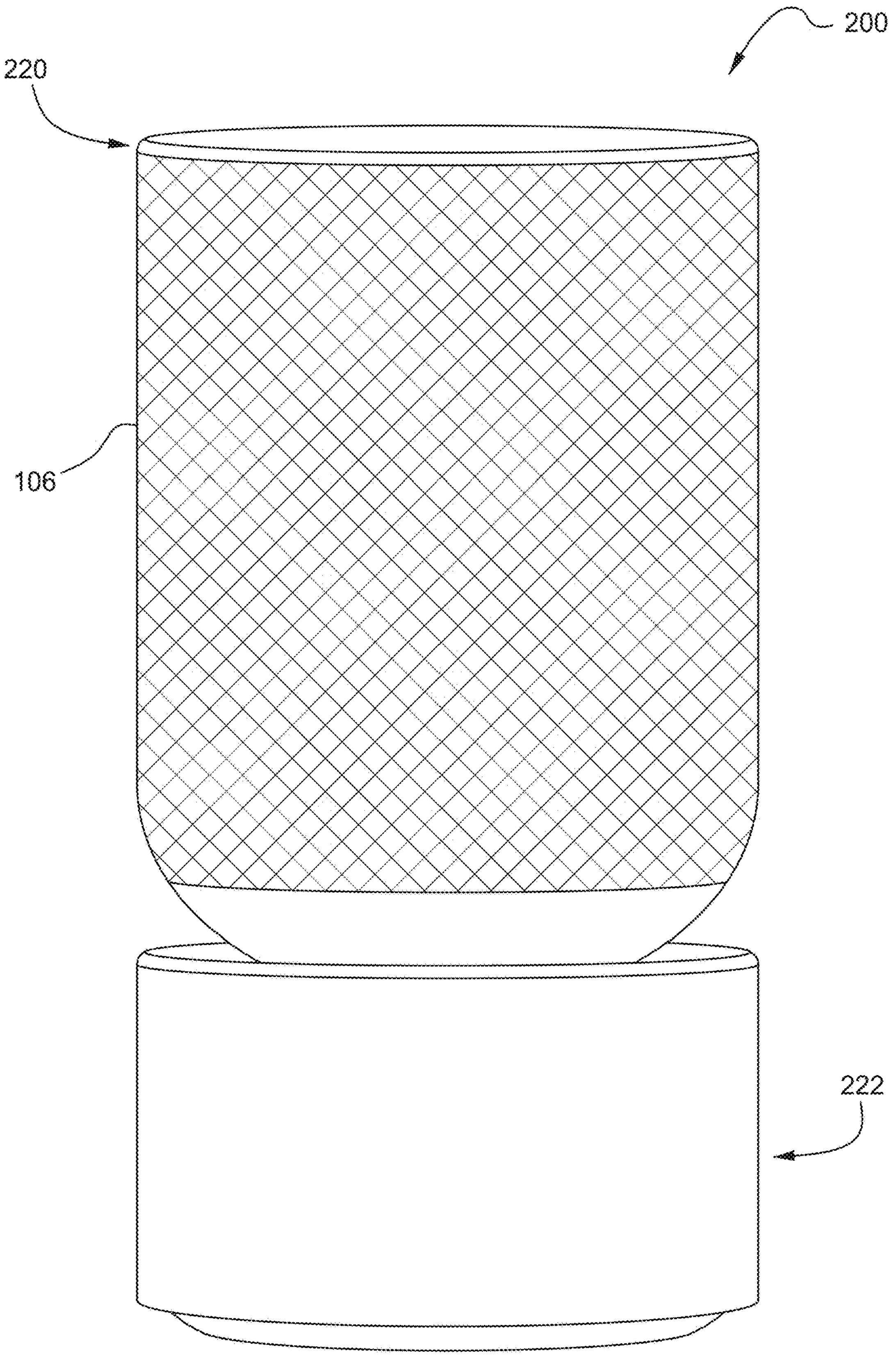
FIG. 1B is a perspective view of a speaker assembly with a smart textile according to an embodiment.

Referring to FIG. 1B, an example speaker assembly 200 is depicted. Speaker assembly 200 includes a base 222 and a housing 220, either or both of which can house a variety of electrical components, including at least an audio transducer or a speaker driver. At least a portion of housing 220 is encased in or otherwise comprises a smart textile 106. Though not explicitly depicted in FIG. 1B, speaker assembly 200 also can include inputs and input ports similar to input element 112, input ports 114, and indicator lights 116 and as otherwise discussed above with respect to FIG. 1A.

Figures 2A, 2B:
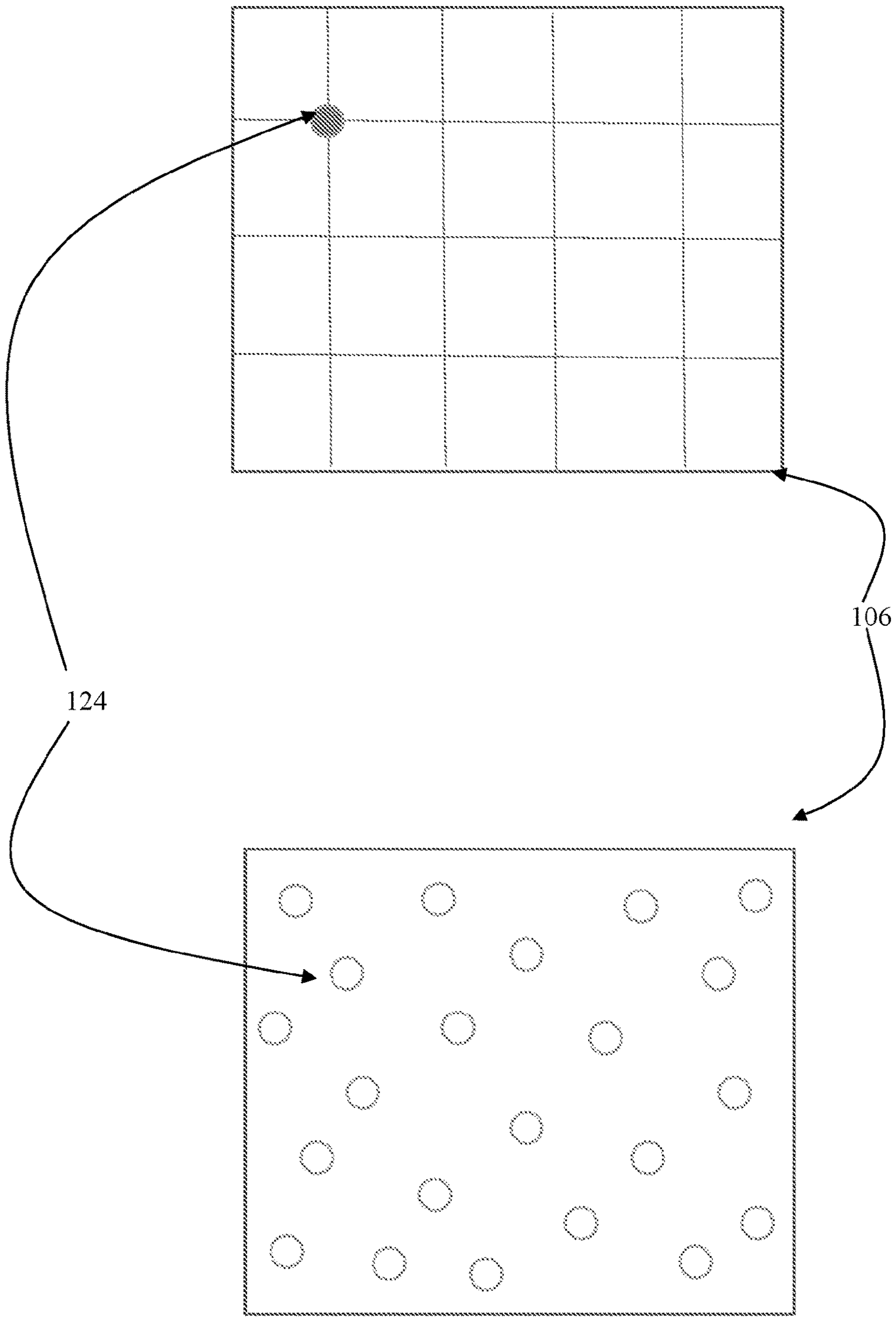
FIG. 2A is a partial view of an example smart textile according to an embodiment.
FIG. 2B is a partial view of a smart textile including a smart textile sensor according to an embodiment.

Referring to FIG. 2A, a partial perspective view of smart textile 106 is depicted. In general, smart textile 106 is any textile, fabric, material, or substance that can facilitate translation of input, such as detected by multimodal sensors, into a signal that can be communicated from smart textile 106 to some other device or system. The detected input can be acquired from a wide array of sources, including pressure changes, changes in sound fields, and changes in electric field, magnetic field, or capacitance, among others. The signal can be electrical, chemical, or of some other form; can be analog or digital; and can be communicated wired or wirelessly. Smart textile 106 can be flexible, rigid, or variable; partially or fully conformable to an underlying surface or structure or self-supporting; of varying textures, such as smooth, bumpy, or rough; varying weaves, gauges, or stitches (e.g., knit, purl, crochet); and any color. The various inputs can be detected from different sensors 124 incorporated into smart textile 106, where in certain embodiments, different fibers that comprise smart textile 106 include different types of sensors 124. In certain embodiments, smart textile 106 can be comprised of microphone fibers which are capable of acquiring input of changes in the sound field.

As such, smart textile 106 generally will be considered to be or form an "active" surface or component. An "active" surface, then, is generally one which is or includes smart textile 106 on some or all of the surface, whereas an "inactive" surface is one that does not have or include smart textile 106. Active surfaces, which provide enhanced sensitivity and immediacy to solutions, can enable smart textile 106 to detect even small forces. In some embodiments, however, inputs to inactive surfaces or devices still can be detected by smart textile 106.

Furthermore, a smart textile 106 can be incorporated into a garment that itself may or not be a smart textile 106. For example, a cushion on the seat of a sofa could include a smart textile 106 portion or surface, whereas the balance of the cushion or sofa is not a smart textile. In another example, the inner band of a hat could be smart textile 106, whereas the top and brim of the hat are not a smart textile. In yet another example, smart textile 106 could be incorporated into or coupled to a portion of a car seat. These and other features and characteristics of smart textile 106 can vary according to a particular use or application, such as will be discussed herein.

In one example, smart textile 106 is a flexible piezoelectrical textile that is capable of transforming mechanical input or stress into one or more electrical signals (e.g., voltage) and transmitting these signals to at least one other element, such as a microprocessor. Conversion or other initial processing of these signals can occur before the signals arrive at the microprocessor, such as analog-to-digital (A/D) conversion. The mechanical input or stress can be from a finger, hand, ear, head, or other body part (in the case of headphones 100 or other wearable devices or items, and some uses of speaker assembly 200) or a surface, device (such as a stylus), or other external element (in the case of some uses of speaker assembly 200 or other devices with smart textile 106).

Thus, smart textile 106 can include a flexible functional fiber comprising a core covered by an insulating coating. The flexible fiber can comprise a plurality of individual electronic or microelectronic elements in a buried material and can comprise a core surrounded by a first conductive layer, a dielectric layer, a second conductive layer, and an outer coating, such as a piezoelectric crystal that is insulated between a plurality of electrodes. Smart textile 106 can be comprised of fibers with a low dielectric constant, a high dielectric constant, a piezoelectric material, a piezoelectric luminescent material, or any combination thereof.

In still other embodiments, effects other than piezoelectric can be implemented by smart textile 106. For example, smart textile 106 can, in an example embodiment, include coaxial piezoresistive material that is capable of converting pressure stimuli to electrical signals by detecting a change in resistance. Piezoelectric material is often made of crystal or ceramic materials such as PZT (i.e., lead zirconate titanate). With piezoresistive material, when a physical disturbance is applied on the material, the piezoresistive material produces a change in resistance in proportion to the magnitude of the applied physical disturbance.

As compared to piezoresistive material, piezoelectric material can be more sensitive and therefore can be advantageous in detecting smaller or more sensitive inputs. However, in static environments, such as applications in which a fixed amount of voltage or charge is generated by a piezoelectric material in response to a constant applied force or pressure, when the applied force is maintained, the piezoelectric material outputs a decreasing signal as imperfect insulating materials and reduction in internal sensor resistance cause a constant loss of electrons. Therefore, there can be difficulties in accurately understanding a constant force or pressure exerted on a piezoelectric material for its entire duration. As such, piezoresistive materials offer a solution because the change in resistance in such a piezoresistive material can remain constant in response to an applied static force or pressure and thus static force or pressure can be more reliably detected. In some embodiments, both piezoelectric and piezoresistive effects can be utilized.

In still other examples, alternative or additional technologies can be used in or with smart textile 106. For example, humidity-based pressure sensors that use dielectric layers to sense changes in humidity and then infer pressure can be used, or electrically conductive polymers that change resistance in response to applied input, such as pressure. Still other effects, such as those responsive to capacitance, heat, static charge, proximity, or other factors, also can be used in or with smart textile 106, alone or in combination with some other effect or technology.

In the present disclosure, smart textile 106 can be used to detect physical touch in conjunction with, for example, using machine learning methods to analyze the input signal(s). As such, smart textile 106 can be or include one or more of a switch, a transducer, an output generator, a data storage device, a transmitter, a receiver, a microprocessor, a power source, or any combination thereof.

In FIG. 2B, an example smart textile 106 is depicted that includes at least one sensor 124 embedded or formed within or by smart textile 106. Sensors 124 can be another way of understanding a function of smart textile 106 of FIG. 2A, or sensors 124 can be additional elements incorporated into or used with smart textile 106 to provide multimodal input. Examples of sensor 124 types can include one or more accelerometers, gyroscopes, magnetometers, barometers, altimeters, temperature sensors, capacitive touch sensors, pulse sensors, load sensors, inertial measurement unit (IMU) sensors (which can comprise one or more gyroscopes, accelerometers, magnetometers, etc.), proximity sensors, or other sensors coupled to textiles which produce outputs allowing movement to be inferred. An accelerometer can sense the direction of gravity and any other linear force experienced by the accelerometer. A gyroscope can measure a Coriolis Effect, heading changes, and rotation. A barometric pressure sensor can measure atmospheric pressure. An altimeter can measure a change in elevation. A temperature sensor can check for the temperature of the surroundings. A pressure sensor can detect if pressure is exerted against a passive or active surface.

A capacitive touch sensor can determine whether human skin is detected against an active or inactive surface or even if human skin or other suitable material (e.g., the paw or nose of an animal) is within a threshold proximity of a surface that comprises or is coupled to a smart textile 106 (i.e., smart textile 106 can recognize if human skin is within some distance, e.g., 1 inch, of the smart textile 106).

Furthermore, any object or event that disrupts the electrical field of the sensors can be detected. For example, electromyography sensors can be configured to be coupled to smart textile 106 to enable smart textile 106 to detect electrical signals emitted as users or living creatures move their muscles. It should be understood, however, that these are merely examples of sensors that can be used in particular implementations, and those of skill in the art will recognize that other types of sensors or combinations of sensors can be used in other examples.

In embodiments, sensor 124 is formed by or coupled with smart textile 106 and can be configured to detect an environmental change, such as a movement or pose by a user. A plurality of sensors 124 can be formed in or positioned throughout smart textile 106, in regular or irregular patterns or arrangements. For example, a density or gauge of fibers in smart textile 106 can be higher in one portion or another, based on how smart textile 106 will be used on or with an underlying device. The positioning of the sensors 124 throughout smart textile 106 creates a system that enables detection of relative position of the sensors 124, which therefore can enhance detection and understanding of the user's movement, orientation, and environment in relation to the location and angle of the sensors 124 of smart textile 106. The same is true in embodiments in which sensors 124 comprise an intersection or interaction of fibers in a woven or knitted material making up smart textile 106.

For example, sensors 124 can be fixedly coupled to smart textile 106, or woven into smart textile 106. Wires or conductive fibers can be woven into smart textile 106 to supply power to the sensors 124 and to provide communications to and from sensors 124. In another example, sensors 124 can be formed by optical fibers woven into or forming smart textile 106. In yet another example, sensors 124 are moveable and capable of being transferred between different smart textile 106 portions or patches to provide increased versatility.

Smart textile 106 can be communicatively coupled to remote (i.e., separate from smart textile 106 even if proximate in space) processing hardware that can comprise at least one processor and memory. In embodiments, input detected by smart textile 106 can be communicated, directly or indirectly, to a server or user device communicatively coupled to and remote from smart textile 106.

Figure 3:
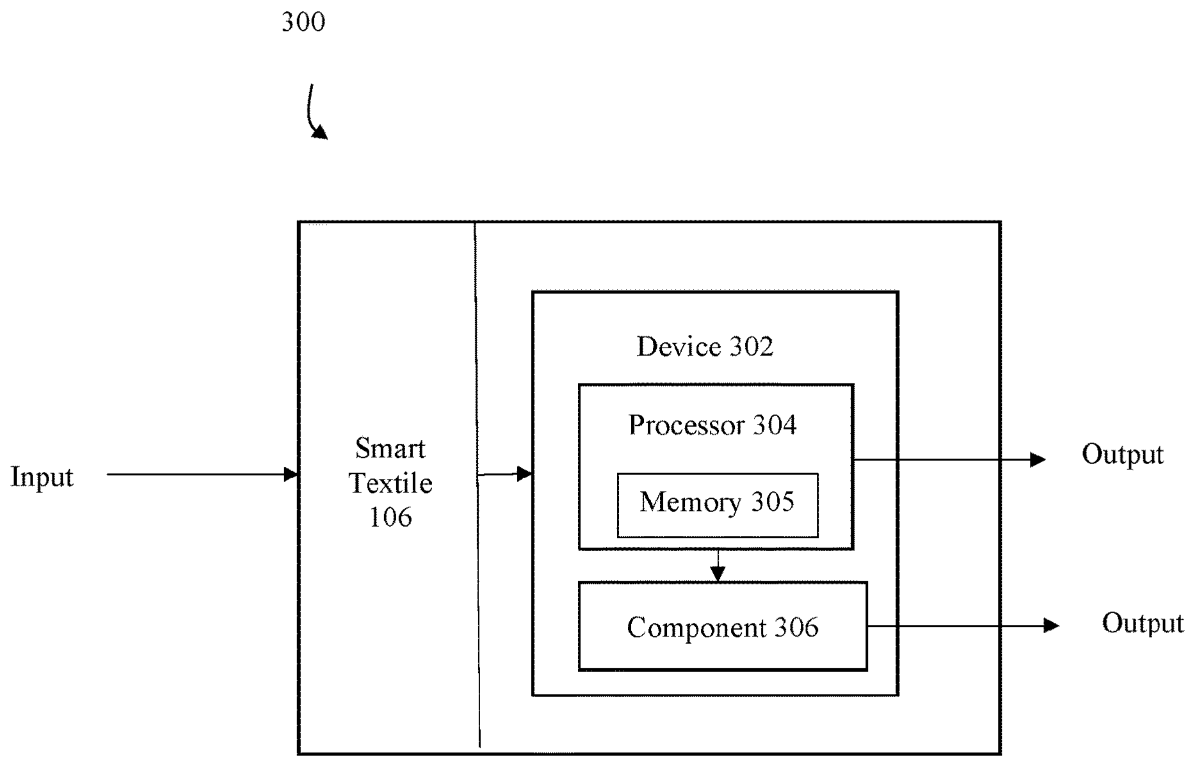
FIG. 3 is a block diagram of an audio system according to an embodiment.

Referring to FIG. 3, a block diagram of a system 300 for detecting input, such as a state of a user of device 302, via smart textile 106 is depicted according to an embodiment. In embodiments, device 302 can be headphones 100, speaker assembly 200, or any other device(s) as discussed elsewhere herein. Device 302 can comprise, include, contain, or otherwise incorporate one or more smart textile 106 portions or coverings on device 302 itself or a peripheral or portion thereof (e.g., on earcups 108 of headphones 100).

In embodiments, device 302 includes at least one processor 304 configured to control one or more features of device 302, including based on input detected by smart textile 106.

Processor 304 can include or operate in conjunction with one or more engines. The use of the term "engine" herein refers to any hardware or software that is constructed, programmed, configured, or otherwise adapted to autonomously carry out a function or set of functions, such as detecting, interfacing, reading, or otherwise acquiring signals from smart textile 106. Engine is herein defined as a real-world device, component, or arrangement of components implemented using hardware, such as by an application specific integrated circuit (ASIC) or field programmable gate array (FPGA), for example, or as a combination of hardware and software, such as by a microprocessor system and a set of program instructions that adapt the engine to implement the particular functionality, which (while being executed) transform the microprocessor system into a special-purpose device. An engine can also be implemented as a combination of the two, with certain functions facilitated by hardware alone, and other functions facilitated by a combination of hardware and software. In certain implementations, at least a portion, and in some cases, all, of an engine can be executed on the processor(s) of one or more computing platforms that are made up of hardware (e.g., one or more processors, data storage devices such as memory or drive storage, input/output facilities such as network interface devices, video devices, keyboard, mouse or touchscreen devices, etc.) that execute an operating system, system programs, and application programs, while also implementing the engine using multitasking, multithreading, distributed (e.g., cluster, peer-peer, cloud, etc.) processing where appropriate, or other such techniques, such as digital signal processors (DSP), FPGAs, and any other processing engines, including processing engines which do not comprise or execute operating systems. Accordingly, each engine can be realized in a variety of physically realizable configurations and should generally not be limited to any particular implementation exemplified herein, unless such limitations are expressly called out.

In embodiments, each engine can itself be composed of more than one sub-engine, each of which can be regarded as an engine in its own right. Moreover, in the embodiments described herein, processor 304 corresponds to defined autonomous functionality; however, it should be understood that in other contemplated embodiments, functionality can be distributed to more than one engine. Likewise, in other contemplated embodiments, multiple defined functionalities can be implemented by a single engine that performs those multiple functions, possibly alongside other functions, or distributed differently among a set of engines than specifically illustrated in the examples herein.

System 300 can be implemented irrespective of the number, type, or location of the engine(s). In embodiments, processor 304 can be within, part of, or separate from a housing of headphones 100 (or speaker assembly 200 or some other device). In an embodiment, processor 304 can operate on a server remote from headphones 100 and smart textile 106. In another embodiment, processor 304 can operate on or as part of smart textile 106. In embodiments, processor 304 can implement one or more classifiers to consider parameters such as type of device 302 and type of smart textile 106 or any component thereof.

Smart textile 106 can be communicatively coupled or remote to processing hardware that can comprise at least one processor and a memory. In embodiments, input to smart textile 106 can be converted to or provided as signals communicated to processor 304 communicatively coupled to and remote from smart textile 106. In embodiments, the piezoelectric or piezoresistive effect in the smart textile 106 generates a multitude of analog signals which can depend on spatial resolution, and thereby which can be converted into digital signals. In embodiments, processor 304, which can be configured to have A/D converter circuitry at the input (multiple A/D converters or an A/D converter with a multiplexer) can handle the conversion. Prior to A/D conversion, signal conditioning can occur in the analog domain, which can include amplification, filtering, converting, range matching, isolation and any other processes required to make sensor output suitable for processing after conditioning. In examples, A/D conversion can occur in the textile 106, where thin-film electronics coat such textiles 106 and where processing can occur. To elaborate, thin film electronics can coat smart textiles 106 coupled to garments or even tattooed skin. Moreover, for example in embodiments comprising garments with smart textile 106, energy harvesting can occur within the garment to power signal conditioning and further processing. Signal conditioning and dedicated A/D conversion is advantageous because use of analog is becoming increasingly popular and relevant.

After processing of the electrical signals, processor 304 can transmit the processed signal to component 306 where an action can be performed, where the action can be an electronic or mechanical action or any other appropriate action that appropriately responds to the particular stimuli. Processor 304 can be any programmable device that accepts data as input, is configured to process the input according to instructions or algorithms and provides results as outputs. In an embodiment, processor 304 can be a central processing unit (CPU) or a microcontroller or microprocessor configured to carry out the instructions of a computer program. Processor 304 is therefore configured to perform at least basic arithmetical, logical, and input/output operations.

Memory 305 can comprise volatile or non-volatile memory as required by the coupled processor 304 to not only provide space to execute the instructions or algorithms, but to provide the space to store the instructions themselves, as well as any intermediate weights, data or activations needed by machine learning models. In embodiments, volatile memory can include random access memory (RAM), dynamic random access memory (DRAM), or static random access memory (SRAM), for example. In embodiments, non-volatile memory can include read-only memory, flash memory, ferroelectric RAM, hard disk, or optical disc storage, for example. The foregoing lists in no way limit the type of memory that can be used, as these embodiments are given only by way of example and are not intended to limit the scope of the present disclosure. Input detected by smart textile 106 can be conveyed to processor 304 and, optionally, saved in memory 305. Memory 305 can be communicatively coupled or remote to device 302, and can be integral with or separate from processor 304.

In use, some form of input is detected by smart textile 106. This input can be direct or indirect touch/pressure, humidity, temperature, proximity, vibration, some other ambient condition, or any other detected environmental characteristic feature that can be received, detected, or perceived by smart textile 106. This input then can be interpreted, converted, or translated into one or more signals that are communicated from smart textile 106 to processor 304. In turn, processor 304 can receive and process or further forward these signals from smart textile 106, which can be used to determine an output, update, or subsequent action by processor 304, the device (e.g., headphones 100), or some other component or device.

Processor 304 can also be configured to process input signals received from smart textile 106 and communicate processed signals to component 306. Component 306 can be configured to execute or select executable actions based on the processed signals, such that, depending on the processed signal, different outcomes occur. Alternately, component 306 can be configured to receive processed signals from processor 304, evaluate the processed signals and select a corresponding feature to be further controlled or manipulated, and then communicate the evaluated selection data to an external device, such as a user device. For example, processor 304 can automatically configure component 306 of headphones 100 based on input detected by smart textile 106. Examples of corresponding features controlled by component 306 can include at least a use state, output volume, audio output selection, playback options, noise canceling modes or features, spatial audio settings, sound mode or equalization, fit, and other characteristics of or related to device 302. In various embodiments, this control can be based on one or more of the following inputs to or sensed by smart textile 106: pressure, humidity, temperature, proximity, capacitance, and others as discussed herein.

Whether implemented by processor 304 or some other processor or engine internal or external to device 302, various embodiments can include the use of artificial intelligence (AI) or machine learning (ML) techniques to recognize or exploit patterns of input to or information sensed by smart textile 106. One example is to identify these patterns based on one or more signals from smart textile 106 using various approaches and techniques, such as but not limited to convolutional or recurrent neural networks and perform an action accordingly. Accordingly, AI or ML models can be efficiently applied to data (data representing known engagement state transitions) by processor 304.

With training from such examples or in other ways, AI or ML models may better recognize when differences in input to smart textile 106 should be associated with different user requests or indications of use or probable state change of device 302. In embodiments, supervised training can occur offline, where a comparison process can include computing similarity metrics using correlation or machine learning regression algorithms and where, as a result of this process, updates could be made in real time. For example, if the similarity of a "take off headphones" gesture is above a certain threshold (e.g., 75%, 90%, 95% or 99% similarity), the matching process can determine that the received input signals indicate a change of user or engagement state and features of the headphones can be controlled accordingly, such as turning off the headphones to preserve battery life. This analysis can be improved during operation by inclusion of initial training or ongoing feedback loops directed to classifying force patterns for particular users. As more comparisons between received input signals and training data are made, feedback of the accuracy of previous comparisons can be tracked to better recognize future data patterns. Pattern recognition can be used to determine triggers, for example for selection of music designed to suit the user's preferences. In embodiments where training does not occur, pattern recognition can be configured to trigger commands in real time, for example selecting pause/playback features.

Examples of input detected by smart textile 106 can include detecting gestures in the case of human-device interaction, headphone fit on a user, or simply detecting the position or gesture of the device with respect to the person controlling the device, where automatic detection of earcups 108 corresponding to the user's left or right ears is enabled. Such automatic detection can remove the need for a user to "correctly" put on headphones 100 over their right and left ears. Engagement states, such as active or inactive, of a device can include a variety of substates that each represent a particular type of use, non-use, or use transition. In one example, a detected force pattern can indicate that device 302 is in a "laying on a surface" substate before being automatically powered off. For example, such a substate could be determined if smart textile 106 has detected no input for a particular time period. In a situation in which smart textile 106 does detect input but the input is not sufficient to meet a threshold, the device can enter a "hold" substate, which can indicate a user is about to use the device such that certain features can be selectively activated or prepped such that an active engagement state can be entered more quickly. For example, a BLUETOOTH connection with a user device can be maintained but playback can be paused. Other inactive use substates can include one or more of "folded," "stowed," "around the neck," and "on a stand," among others varying according to the device.

Additionally, smart textile 106 can be used to sense health biometrics such as heart rate/pulse or temperature, which can be indicative of a user's emotional and physical states. Specific examples are discussed herein below, with reference to headphones 100, speaker assembly 200, or other devices as device 302. Some example may relate to devices that are audio-visual, are primarily not but include some audio feature, or are unrelated to audio functions, without being limited by reference to device 302.

In a first example related to headphones 100, smart textile 106 can detect whether or not headphones 100 or earbuds (or some other device, such as clothing or a hat or watch) are being worn by a user. In an example related to headphones 100, smart textile 106 detects at least one pressure from the fit of headphones 100 (or the earbuds) with respect to the user's head and ears. This detected pressure is translated into at least one signal provided to processor 304, which in turn applies AI, ML, or other suitable techniques to determine whether the signal (i.e., pressure) pattern detected by smart textile 106 indicates that headphones 100 are in active use, or, in other words, being actively worn by the user. Processor 304 then can be programmed to take or not take follow up action. For example, if processor 304 determines that headphones 100 are actively being worn, processor 304 can determine that active audio output should begin or continue. If instead processor 304 determines that headphones 100 have been fully or partially removed, processor 304 can be programmed to pause active audio output, prompt a user for input related to whether audio output should be paused or continued, or take some other action or inaction.

In another example related to headphones 100, smart textile 106 can detect electrical signals produced by muscular movement of the user. In this example, smart textile 106, which can be comprised of electromyographical fibers, can be configured to detect electrical signals emitted by the user as the user's muscles move, where examples can include jaw clenches, user hand motions, or other positions flagged as relevant. These electrical signals can be detected, converted for further processing, and transmitted to processor 304 where processor 304 can be configured to process the signals and output them or move them forward to component 306. Processing can include evaluating the detected signals and reconstructing user speech patterns in noisy environments or performing "gesture" (i.e. trigger commands) with analysis of user movements or even jerk detection (i.e., evaluating sudden falls or jarring input, wherein a signaling alarm or notification would follow the determination, such as an automatic call to an emergency contact or authorities, like 911 in the United States). Processor 304 can be programmed to adjust one or more output characteristics of headphones 100 accordingly.

In another example related to headphones 100, smart textile 106 can detect an orientation of headphones 100. In this example, smart textile 106 detects pressure patterns on headphones 100, including one or more of earcup 108, ear cushion 110, and headband 102, that indicate the shape and orientation of a human ear and head when headphones 100 are being worn. These pressure inputs are converted into electrical signals and transmitted to processor 304, where processor 304 processes the signals to evaluate the signals from smart textile 106 to determine a relative orientation of headphones 100 to one or both of a user's head and ear canals. To elaborate, pressure patterns detected by smart textile 106 can reveal the particular ear shape of a user, from which processor 304 can identify a left ear from a right ear. This can eliminate the need for headphones 100 to have a dedicated "right" and "left" orientation, or for a user to put headphones 100 on "correctly" with respect to a right vs. left orientation.

Additionally, from detected ear shape, size, or other characteristics, a Head Related Transfer Function for the particular user can be estimated via the processor 304 such that more realistic or customized spatial audio renderings can be provided to the user as output from headphones 100. Further processing by processor 304 then can be carried out to, e.g., determine details of the fit of headphones 100 on the particular user (such as by estimating a direction or distance of the user's ear canal to adjust, adapt, or customize acoustic output). In yet another example, the details of the fit of headphones 100 via smart textile 106 can reveal that the user is wearing eyeglasses or sunglasses, which can affect the audio experience of the user. Processor 304 can be programmed to adjust one or more output characteristics of headphones 100 accordingly.

In another example relating to headphones 100, biometric information can be detected by smart textile 106 when headphones 100 are worn by a user, such as by detecting pressure patterns that correspond to vibrations in the body or by detecting electrical signals corresponding to user muscle movements. For example, speaking causes vibrations in and on the head that can be detected by smart textile 106, and muscle movement emits electrical signals. These signals, vibrational or electrical, can be detected by smart textile 106. When input signals from smart textile 106 are detected and converted and then transmitted to be processed by processor 304, the signals can be used to determine a particular acoustic profile of the user based on their anatomy. Furthermore, smart textile 106 can be configured to detect vibrations or electrical signals corresponding to specific voice commands of headphones 100, such as pausing audio output, changing an Active Noise Canceling (ANC) setting or profile, transferring audio of a voice call from a peripheral device (e.g., a smart phone) to headphones 100, activating a microphone on or related to headphones 100 for speech enhancement, or some other feature. In another embodiment of a previous example, a biometric profile obtained via smart textile 106 can lead processor 304 to determine that headphones 100 are being worn around a user's neck rather than on their head and over their ears.

In another example relating to headphones 100 and biometrics, smart textile 106 can detect pressure patterns indicative of heart rate vibrations through the user's body and can detect humidity or skin conductivity through humidity and skin conductivity sensors. Once detected, smart textile 106 can convert the input into an electrical signal and transmit to processor 304 for further processing. Processor 304 can process the signal and evaluate appropriate action. For example, if the processed signal indicates a particular user heart rate, component 306 can output a signal to indicate appropriate music matching the tempo of the user heartrate to external user device, adjusting volume appropriately, optimizing sports setting tracking relating to a health metric such as monitoring performance (complementing preexisting sensors on a user device, such as a wristwatch or chest-worn fitness tracker), or any other feature relevant to user preference of audio visual settings based on user heart rate. If processor 304 evaluates that humidity on the user's skin is above or below a threshold level and makes a determination of the user's skin conductivity, then a determination can also be made on user mood (i.e., if user is "clammy," etc.) Processor 304 can further process evaluated heartrate to indicate user "mood."

In another example relating to headphones 100, smart textile 106 can be configured to detect vibrational or other pressure patterns and capacitive touch which corresponds to fit of ear cushion 110 around a user's ear. This can include pressure from wind or air passing over earcups 108 or between earcups 108 and part of the user's head or neck. Processor 304 can receive these signals from smart textile 106 to determine fit, sound leakage, ANC leakage, a use case (e.g., while a user is walking or running outside), or an environmental condition (e.g., wind or air flowing on or past headphones 100). Upon receiving and processing such signals at processor 304, processor 304 can cause components of headphones 100 to compensate for or correct the leakage, use case, or environmental condition, such as by prompting the user to adjust the fit of headphones 100, changing an ANC or other setting of headphones 100, or taking some other action. This can be advantageous because leakage can be detrimental to sound quality in ANC systems, resulting in poor performance, such that processing signals related to a particular user experience and taking appropriate correcting actions based on detected ANC leakage can provide an enhanced experience. Smart textile 106 can also be configured to detect other relevant considerations which contribute to performance in ANC. For example, smart textile 106 can be configured to detect wind, where wind gust can cause subtle pressure forces on the ear cushion 110. Smart textile 106 can detect pressure caused by wind gust, translate the pressure input as an electrical signal, and transmit the signal to processor 304 for further processing. Wind detection is useful to modify the ANC settings under windy conditions as well as transparency and equalization parameters.

In another example relating to headphones 100, smart textile 106 can detect vibrational or contact pressure patterns which indicate hand gestures or positions. For example, when smart textile 106 is coupled to ear cup 108, smart textile 106 can detect pressure exerted on earcup 108, which can then be translated into an electrical signal and conveyed to processor 304 for further processing, including interpretation that headphones 100 is in an active engagement state (i.e., pressing of actuator indicates turning on headphones 100). In operation, force applied to exterior of ear cushion 110 by a headband 102 can automatically trigger a signal to power on headphones 100 or adjust a setting of headphones 100. This can include a user touching, tapping, or sliding a finger across or along a portion of smart textile 106. The signals from smart textile 106 can be processed by processor 304 to determine a nature of the touch (e.g., level of pressure), tapping pressure or pattern, direction of sliding touch, sweeps (i.e., movement of a user's finger(s) across the surface of the textile), or other characteristics of contact pressure. Related signals from smart textile 106 can be sent to processor 304 to be processed and interpreted as commands or other user input. In some implementations, smart textile 106 can be configured to detect and measure the force of touch on the textile 106. The detected and measured forces can be sent as an electrical signal to processor 304, where the electrical signal is processed to generate additional user inputs and/or commands. Processor 304 can be programmed to interpret these characteristics in different ways, including according to a standard or user-selected program. Thus, sliding a finger up along smart textile 106 can be initially programmed to indicate a desired increase in volume output, though a user may customize this or other gestures, such as by using an application operating on a smart phone communicatively coupled with headphones 100.

In other embodiments, vibrational gestures detected by smart textile 106 can be evaluated by processor 304 such that patterns are identified corresponding to gestures to control a settings interface, for example for tracing out letters to an active surface when entering a password to join a wireless network, or for identity or theft protection such as for using gestures to trace out patterns to unlock a user device. In embodiments, smart textiles 106 directed to settings interfaces can also be configured to include a code such that users need to enter password periodically rather than continuously.

For example, a relative increase in force exerted when the headband 102 of headphones 100 is extended (e.g., worn around a user's head) can be detected by smart textile 106 to process and recognize an engaged or disengaged state and to control features of headphones 100 accordingly. In an example, engaged states in relation to headphones 100 can include any situation in which a user is wearing headphones 100 and would likely desire headphones 100 to produce sound, provide noise canceling functionality, or otherwise operate. Disengaged states in relation to headphones 100 can include one or more of the headphones 100 being placed on a flat surface, folded, stowed in a container, worn around the neck rather than over the ears, placed on a headphone stand, or held by a user.

In another example relating to headphones 100, smart textile 106 can be configured to further enhance human-device or human-machine interactions. Smart textile 106 is configured to include having capability to detect stretching or expansion, where stretching or expansion can be indicative of cavity depth or size between drivers of headphones 100 and user ear canal, as cavities can affect frequency response of reproduced signals and because any delta between driver and ear canals can affect filtering that allows for detection and compensation techniques. If cavity size can be reasonably estimated, processing can be modified to enable desired frequency response (e.g., equalization). Inclusion of a 3D textile button can enhance sensitive control of the circuitry of the smart textile 106, including its on or off state, and likewise enhance spacing and stiffness of an insulating layer to prevent potential short circuit caused by false touches. In certain embodiments, smart textile 106 can further include a 3D textile button which comprises a 3D textile sensor array, which can enable smart textile 106 to track trajectory and demonstrate textile computing features, which enable further creation and enhancement of smart textiles to couple to electronic devices for human-device interfaces.

Embodiments relating to speaker assemblies can also comprise smart textile 106 to detect input, convert the input into an electrical signal, process the signal, and generate output.

In an example relating to speaker assembly 200, smart textile 106 detects pressure from user touch (as discussed above with respect to headphones 100) and translates the pressure input into an electrical signal. These signals are provided to processor 304, which in turn applies machine learning techniques to determine whether pressure patterns correspond to particular output changes desired by a user (e.g., on/off, volume up/down, audio selection forward/backward).

In another example relating to speaker assembly 200, smart textile 106 detects vibrational pressure patterns through the air. These pressure inputs are converted to electrical signals and transmitted to processor 304. Vibrational patterns in the air can indicate user or device proximity to speaker assembly 200, where processor 304 can process the pressure patterns and evaluate proximity, and correspondingly generate an output to indicate whether, based on user proximity, speaker assembly is in use and should be powered on or whether speaker assembly is not in use and should be powered off. For speaker assemblies 200 with sufficient conformal sensing textiles to be configured in a multitude of positions, the actual position of the speaker assembly 200 can be evaluated from evaluating position of the user. Such a feature can be especially useful for speaker assemblies 200 that can be placed in many different positions, as it allows for optimal acoustic compensation, e.g., from usual equalization to directivity pattern modification. In still other embodiments, speaker assembly 200 can output a test signal or regular audio and detect return pressure signals by smart textile 106 to determine proximity to or a characteristic of a wall, surface, furniture, person, or other object(s). Processor 304 can use these return pressure signals detected by smart textile 106 to adjust operation, sound output, or some other characteristic.

In another example relating to speaker assembly 200, smart textile 106 can detect pressure patterns which correspond to vibrations in or from a user. For example, speaking causes vibrations in and on the head and body that can be detected by smart textile 106. When converted input signals from smart textile 106 are processed by processor 304, these vibrations can be used to determine a particular acoustic profile of the user based on their anatomy, or a location or distance of the user relative to speaker assembly 200. Furthermore, smart textile 106 can be configured to detect vibrations corresponding to specific voice commands of speaker assembly 200, such as pausing audio output, changing a white noise setting or profile (e.g., modifying equalization to mask environmental noise, or to mask environmental noise with selected noise), transferring audio of a voice call from a peripheral device (e.g., a smart phone) to speaker assembly 200, activating a microphone on or related to speaker assembly 200 for speech enhancement, or some other feature.

In another example relating to speaker assembly 200, smart textile 106 can be configured to detect pressure patterns and capacitive touch which corresponds to environmental features relating to background noise, such as for example wind detection or airflow from a fan or HVAC system or in an outdoor use case of the speaker assembly 200. Smart textile 106 can detect pressure caused by wind gust, translate the pressure input as an electrical signal, and transmit the signal to processor 304 for further processing. Wind detection is useful to modify the white noise under windy conditions as well as transparency and equalization parameters.

In another example relating to speaker assembly 200, smart textile 106 can detect direct vibrational pressure patterns which indicate hand gestures or positions. For example, smart textile 106 can detect pressure exerted on speaker assembly 200, which can then be translated into an electrical signal and conveyed to processor 304 for further processing, including interpretation that speaker assembly 200 is in an active engagement state (i.e., pressing of actuator indicates turning on speaker assembly 200). In operation, force applied to exterior of speaker assembly 200 can automatically trigger a signal to power on speaker assembly 200. This detected force can also automatically trigger or control other related components 306 based on an active engagement state. In other embodiments, vibrational gestures detected by smart textile 106 can be evaluated by processor 304 such that patterns are identified corresponding to gestures to control a settings interface, for example for tracing out letters to an active surface when entering a password to join a wireless network, or for identity or theft protection such as for using gestures to trace out patterns to unlock a user device. In embodiments, smart textiles 106 directed to settings interfaces can also be configured to include a code such that users need to enter password periodically rather than continuously. Advantageously, gesture recognition directed to a settings interface can include obviating the need for user devices such as smartphones to join user networks.

In another example relating to speaker assembly 200, smart textile 106 can receive indirect pressure input, such as for example detecting vibrations transmitted throughout the user's body, such as clapping hands, tapping feet, pinching fingers, or any body movement that can reasonably reverberate vibrations sufficiently such that pressure sensors coupled to or embedded in smart textile 106 can detect such indirect pressure. Indirect pressure can be processed by processor 304 for further manipulation, including for human-device interactions. For example, processor 304 receives signals from smart textile 106 that can be based on a combination of pressure patterns detected by smart textile 106, where different vibrations create different pressure patterns which can be detected by smart textile 106. Each pressure pattern or arrangement can be processed by processor 304 as a designated gesture which can be transmitted to an external user device or which can be configured to be transmitted to component 306 to trigger a command. Such a configuration could be enabled, for example, as a user demonstrates hand grasping, stroking, pushing, or pulling in relation to smart textile 106. As examples, certain gestures can control the usual playback buttons such as play, stop, forward/rewind, or changing tracks of speaker assembly 200.

For example, a relative increase in force exerted on speaker assembly 200 can be detected by smart textile 106 to process and recognize an engaged or disengaged state and to control features of speaker assembly 200 accordingly. In an example, engaged states in relation to speaker assembly 200 can include any situation in which a user has directly engaged in actuating speaker assembly 200 and would likely desire speaker assembly 200 to produce sound or otherwise operate. Disengaged states in relation to speaker assembly 200 can include one or more of the speaker assembly 200 being actuated off, stowed in a case or container, placed on a speaker assembly stand, or held off the ground.

In another example relating to speaker assembly 200 (as well as headphones 100), smart textile 106 can detect pressure patterns indicative of heart rate vibrations through the user's body. Once detected, smart textile 106 can convert the input into an electrical signal and transmit to processor 304 for further processing. Processor 304 can process the signal and evaluate appropriate action. For example, if the processed signal indicates a slow or steady user heartrate, component 306 can output a signal to indicate appropriate music matching the tempo of the user heartrate to external user device, adjusting volume appropriately, or any other feature relevant to user preference of audiovisual settings based on user heart rate. Processor 304 can further process evaluated heartrate to indicate user "mood" or whether a user is asleep or awake.

In another example relating to speaker assembly 200, smart textile 106 (which can be coupled to various surfaces of speaker assembly 200) can detect pressure signals, which can be converted into electrical signals and transmitted to processor 304 for further processing. Processor 304 can evaluate the orientation of speaker assembly 200 (e.g., whether speaker assembly 200 is upright, laying down, tilted, etc.) as a result of orientation of the surfaces of the speaker assembly housing 220. Different surfaces can be coupled to smart textile 106, and can further enable the orientation of speaker assembly 200 to be assessed, and appropriate acoustical adjustments can be made for each orientation.

In embodiments, smart textile 106 can be controlled or programmed by an external user device which enables a user to run an instance of the user interface designed to facilitate user interaction with one or more features of device 302. This can include an application running on a smart phone, tablet, smart watch, computer, vehicle, or other device. The user interface can be configured to receive user inputs and provide outputs regarding configuration and status of device 302. The user interface can allow for personalized system control and calibration, such as enabling a user to calibrate one or more features by placing the device 302 in a desired position and recording sample sensor input. Such calibration can enable more flexible input acquisition, such as only one earcup resting on a user's ear. In embodiments, smart textile 106 can be associated with one or more user profiles that can each represent distinct feature handling requirements based on detected engagement state of device 302.

Although described with respect to devices, it should be appreciated that embodiments of the present disclosure can pertain to any user devices and include any features that can be controlled including one or more of establishing or disconnecting a wired or wireless connection with smart textile 106 or a processor coupled thereto. This can include enabling or disabling of user input mechanisms of device 302 (such as a touch-based user interface), and configuring parameters based on detected engagement state. For example, ear buds incorporating smart textile 106, such as by detecting pressure on particular portions of the ear tips, can be configured to detect engagement states and control features in a similar manner as presented in this disclosure, including volume control and play/pause functionality. As another example, televisions or other screens incorporating smart textile 106 can be configured to detect engagement states and control features as similarly presented herein. In yet another example, smart textile 106 can be used on a remote control for audiovisual devices, active surfaces, or various other settings (for example, smart textile 106 can be configured to enable the user to control a television using headphones 100, or smart textile 106 coupled to a sofa can be configured to enable the user to control light settings in different rooms, or smart textile 106 can be coupled to a handheld remote, where smart textile 106 can detect inputs, processor 304 can process the converted input signals, and an output can occur which can be in the form of controlling or manipulating a corresponding user device). In other examples directed to the arena of sports or clothing or sports clothing, smart textile 106 could comprise a strap of a wristwatch, where inputs are detected and further processed after appropriate steps; smart textile 106 can also be incorporated into or otherwise coupled to be a sports headband, a body-band, a chest strap, a hat, a beanie, a sweatband, or any other worn clothing or device directed to sports and/or athletics. Other examples include automobiles, aircraft, recreational vehicles, boats, smart surfaces (such as walls, whiteboards, and physical or retail displays), public transport, or virtually any setting in which a smart textile can be arranged to detect engagement or interaction states and control features.

Figure 4:
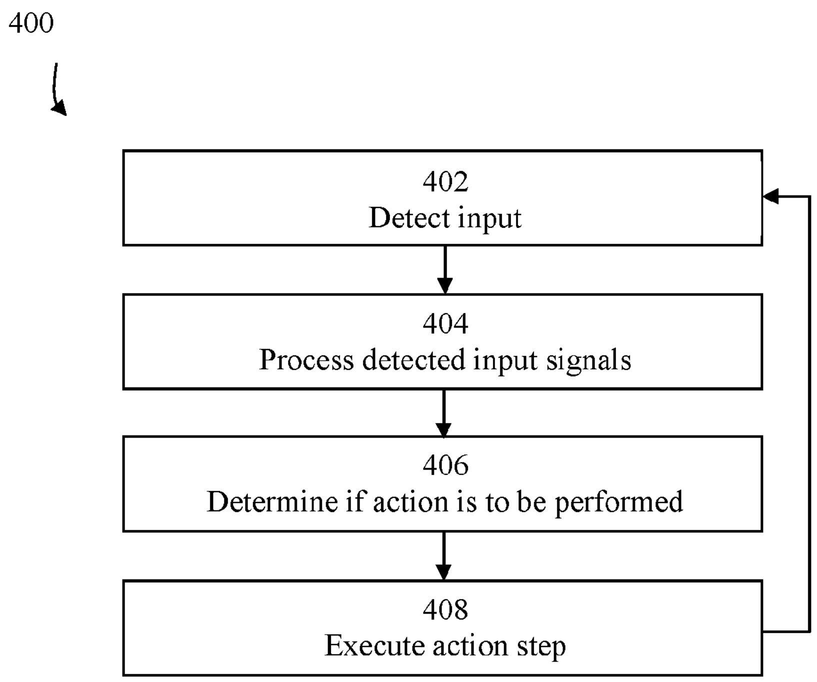
FIG. 4 is a flowchart of a method related to a device with a smart textile according to an embodiment.

Referring to FIG. 4, a flow chart of a method 400 for controlling one or more features of a device using a smart textile is depicted according to an embodiment. In embodiments, headphones 100, speaker assembly 200, or any audio or other devices as discussed herein can implement method 400.

At 402, input to a smart textile is detected. At 404, one or more signals related to the input detected at 402 is processed, such as using AI or an ML algorithm. At 406, a determination is made with respect to whether the processed signals from the smart textile correspond with a related action to be taken or performed. If so, at 408 the action is executed.

Accordingly, the present disclosure relates to a wide variety of devices and applications that can have active surfaces or housings.

Active surfaces, which provide enhanced sensitivity and immediacy to solutions, can enable smart textile 106 to detect even small forces. Smart textile 106 also can be arranged or configured to detect force exerted on proximal or coupled inactive surfaces, such as for example, detecting force outwardly exerted on headband 102 as headband 102 extends or retracts, which can originate from the user as the user places headphones 100 on his head. Inactive surfaces can provide cost-effective implementations of smart textile 106.

Increasing the sensing capabilities of machines is essential to improve naturalness in human-machine interactions and to create adaptive and dynamically customizable systems. In particular, we incorporate conformal sensing textiles to endow classical audio/video reproduction systems—e.g., headphones, loudspeakers, soundbars and televisions—with a conformal and high-resolution tactile interface. One approach is the use of smart textiles that consists of coaxial piezoresistive fibers to convert pressure stimuli to electrical signals. Other technologies also exist, e.g., humidity-based pressure sensors that use dielectric layers to sense changes in humidity and then infer pressure, or electrically conductive polymers that change resistance to applied pressure. In the present invention, we focus on applying these sensing textiles to headphones and loudspeakers. In both cases, these sensing textiles conform totally or partially to the shapes and surfaces of these devices, e.g., the headphone cushion or the loudspeaker grille. We apply this to detect physical touch using, for example, machine learning methods, i.e., detecting gestures (in the case of human-device interaction) or the headphone fit on a user, or simply detecting the pose of the device, or the person controlling the device. Additionally, we can use it to track health metrics such as heart rate which could be indicative of both the user's emotional and physical states. After sensing, an action is usually performed. This can be an electronic or mechanical action that appropriately responds to that stimuli. Based on the characteristics of gestures (i.e., grasping spatial arrangement and force applied), it could be used to manipulate the playback signal or even directivity patterns in loudspeakers. When detecting how the headphone fits on a user, acoustic compensations and/or actions, e.g., equalization, ANC calibration, or manipulating the playback signal, or mechanical adjustments can follow.

The disclosure concerns endowing audio devices with touch sensing capabilities. The underlying technology is based on pressure sensing fibers in textile that can conform to objects and detect the force applied with a high resolution across the surface of the textile. As such, they can be easily, cheaply, and readily incorporated in wearable audio devices and loudspeakers.

The applications of smart textiles to headphones/loudspeakers are many and each of these can be a different patent application on its own. Based on the pressure applied to the sensing textile, it is possible to tackle the problems below. In some cases, we may need to impose a real-time constraint.

1. Smart headphone ear cushion:
   a. Detecting headphone fit:
      i. Engaged: when the user has the headphones on, estimate closeness of the headphone driver to the user's ear canal. This varies from person to person due to different shapes of heads/ears across population. Headphone equalization can then be adjusted or a mechanical means can be incorporated into the headphones that adjust the ear cushion position depending on the fitting.
      ii. Disengaged: detect if the user is wearing the headphones or not. Classical capacitive sensing approaches lead to poor performance.
   b. Gesture recognition: detection of gestures based on a combination of pressure patterns on the sensing ear cushion or headband. Each gesture pattern/arrangement triggers a command. This would be typically done via hand grasping, and/or stroking, pushing and pulling. As examples, certain gestures can control the usual playback buttons such as play, stop, forward/rewind, or changing tracks. It can also control ANC suppression level or even just the volume level of the playback signal. Additionally, it can also be used for the classical actions before/during/after voice calls. A variety of hand gestures and/or actions can be detected by the pressure sensors on the ear cup due to the vibrations transmitted over the body, e.g., pinching, tapping fingers/feet. These can also be used for interaction.
   c. Biometrics:
      i. Heart rate: monitoring of heart rate due to the vibrations causing different pressure patterns around the ear. This can provide useful health information to the user. It can also be used to infer emotional reaction to context and the playback content.
      ii. Ear shape: the pattern of the pressure sensors can reveal the ear shape. From this, the Head Related Transfer Function can be estimated. This allows for realistic spatial audio renderings.
      iii. Any additional biometric readings that can be determined by means of measuring vibrations in the body, e.g., voice causes vibrations on the head that could be used for speech enhancement or voice activity detection.
   d. ANC leakage: detect that the headphone ear cushion is not properly sealed around the user's ear. This causes misbehavior in ANC systems leading to poor performance.
   e. Wind detection: wind gust can cause subtle pressure forces on the ear cushion, these could be inferred by these integrated sensors and provide a better wind detector. This provides useful information to modify the ANC settings under windy conditions as well as transparency and equalization parameters.

2. Loudspeaker cover:
   a. Gestures: same concepts as above in terms of gestures for interaction. For example, it can help setting the different controls for the playback signal or even assign gesture pressure patterns such as stroking around the perimeter to effectuate different directivity patterns, volume settings, or the balance of how much the sound is focused or diffused (cloud like). Furthermore, the area could be used for applying and or updating settings on the speaker, for example, spelling out a password that is needed to join a wireless network upon initial setup, by dragging the finger over the surface of the speaker.
   b. Pose: for loudspeakers with enough conformal sensing textiles around them that are also designed to be placed in any random pose or position, this pose could be inferred. This can be especially useful for loudspeakers that can be placed in many different poses/positions. This allows us to compensate acoustically, e.g., from usual equalization to directivity pattern modification.

Most of the tactile and touch interfaces known conventionally are usually rigid surfaces and only provide binary information, i.e., touch or no touch. This makes it technically challenging to conform to any device shape. In some known approaches, fixed pressure sensors are used to perform acoustic compensation. The resolution of these sensors is limited, i.e., the density that one can achieve. This narrows down the applications they can be used for (mainly for detecting if the ear canal is not sealed by the earphone). Additionally, they are usually mounted on a rigid surface.

In examples of this disclosure, conformal materials are used, i.e., they can easily adjust and adapt to the shape and material they are covering. Also, due to the familiarity and softness of textiles, it provides a more natural and comfortable interaction. Additionally, they provide feedback about the intensity of the force applied.

As opposed to fixed pressure sensors mounted on rigid surfaces, smart textiles provide a much higher resolution, thus allowing us to exploit this information for many applications (see corresponding section above).

Most of the focus of conventional smart textiles have been on actual clothing for humans or robots to aid physical humanoid-robot interaction, i.e., endowing human-like robots with the sense of touch. In examples of this disclosure, smart textiles are incorporated into regular audio/video devices for not only interaction but to also exploit the information to adapt acoustic settings, e.g., equalization for tight/loose fitting, or ANC leakage correction/detection.

Additionally, many conventional approaches regarding pressure sensors focused on an extremely low number of them on rigid surfaces. Examples incorporate higher resolution and conformal materials that allow to increase the range of applications that this can be used for. In addition, since conformal materials can in principle cover the entire surface of a device such as loudspeaker, users can control and interact with the device from many angles.

Headphone ear cushions and loudspeaker covers consist of conformal sensing textiles. The weaving of the textile fibers is done in such a way that they output a value proportional to the inter-fiber pressure. This output array of data undergoes signal conditioning and signal information extraction. The latter can involve machine learning and/or artificial intelligence algorithms or time series methods designed for each of the applications mentioned above. In particular, the interaction with these sensors will create specific pressure patterns for specific actions, e.g., hand grasping, machine learning techniques can help us recognize these patterns.

The following clauses are part of the present disclosure.

In clause 1, the present disclosure includes a system comprising a smart textile arranged on at least a portion of a surface of a device configured to detect at least one input from a plurality of inputs; and at least one processor communicatively coupled to the smart textile and configured to: receive at least one signal from the smart textile related to each detected input to the smart textile, process each received signal to identify at least one characteristic of the input from a plurality of characteristics, and based on each identified characteristic, cause a change associated with the input detected by the smart textile.

In clause 2, the present disclosure includes the system of in clause 1, wherein the device is at least one of headphones, earphones, a speaker, a soundbar, a sound system, a remote control, a smart phone, a tablet, a smart watch, a fitness tracking device, a computer, a monitor, a television, a vehicle, a vessel, an item of furniture, a garment, a wearable item, or an aircraft.

In clause 3, the present disclosure includes the system of clause 1 or clause 2, wherein the at least one processor is arranged within the device.

In clause 4, the present disclosure includes the system of any of clauses 1 through 3, wherein the at least one processor is external to the device.

In clause 5, the present disclosure includes the system of any of clauses 1 through 4, wherein the smart textile uses at least one of a piezoelectric effect, a piezoresistive effect, an optical effect, or an electromyographic effect.

In clause 6, the present disclosure includes the system of any of clauses 1 through 5, wherein the input to the smart textile is at least one of pressure, deformation, temperature, a change in capacitance, a change in a magnetic field, a change in an electric field, or humidity.

In clause 7, the present disclosure includes the system of any of clauses 1 through 6, wherein the least one processor is configured to process the at least one signal using at least one of artificial intelligence or machine learning.

In clause 8, the present disclosure includes the system of any of clauses 1 through 7, wherein causing the change associated with the input to the smart textile further comprises causing a type or degree of change based on the at least one characteristic.

In clause 9, the present disclosure includes the system of any of clauses 1 through 8, wherein the at least one caused change is at least one of a change in an operating state, a change in an output characteristic, or an output of a prompt to a user.

In clause 10, the present disclosure includes the system of any of clauses 1 through 9, wherein the change in the output characteristic is a change to an active noise canceling (ANC) mode or setting.

In clause 11, the present disclosure includes a method comprising: communicatively coupling a smart textile to at least one processor of a first device, wherein the smart textile is configured to detect at least one input from a plurality of inputs; receiving at least one signal from the smart textile related to each detected input; processing each received signal to identify at least one characteristic from a plurality of characteristics; and based on each identified characteristic, causing a change associated with the input detected by the smart textile.

In clause 12, the present disclosure includes the method of clause 11, wherein causing the change further comprises changing at least one of an operating state, an output characteristic, or initiating a prompt to a user.

In clause 13, the present disclosure includes the method of clause 11 or clause 12, wherein changing at least one of the operating state, the output characteristic, or initiating the prompt to a user is carried out by the first device.

In clause 14, the present disclosure includes the method of clause 12 or clause 13, wherein changing at least one of the operating state, the output characteristic, or initiating the prompt to a user is carried out by a second device.

In clause 15, the present disclosure includes the method of clause 11 or clause 12, wherein changing at least one of the operating state, the output characteristic, or initiating the prompt to a user is carried out by the first device and a second device.

In clause 16, the present disclosure includes the method of any of clauses 11 through 15, wherein the at least one signal received from the smart textile is related to input to the smart textile that is at least one of pressure, deformation, temperature, a change in capacitance, a change in a magnetic field, a change in an electric field, or humidity.

In clause 17, the present disclosure includes the method of any of clauses 11 through 16, further comprising coupling the smart textile to the first device.

In clause 18, the present disclosure includes a set of headphones comprising: a smart textile arranged on at least a portion of the headphones; and at least one processor communicatively coupled with the smart textile and configured to: receive at least one signal from the smart textile related to input to the set of headphones, process the at least one signal to identify at least one characteristic of the input, and based on the processing, cause a change associated with the input to the headphones.

In clause 19, the present disclosure includes a speaker comprising: a smart textile arranged on at least a portion of the speaker; and at least one processor communicatively coupled with the smart textile and configured to: receive at least one signal from the smart textile related to input to the speaker, process the at least one signal to identify at least one characteristic of the input, and based on the processing, cause a change associated with the input to the speaker.

Various embodiments of systems, devices, and methods have been described herein. These embodiments are given only by way of example and are not intended to limit the scope of the claimed inventions. It should be appreciated, moreover, that the various features of the embodiments that have been described can be combined in various ways to produce numerous additional embodiments. Moreover, while various materials, dimensions, shapes, configurations and locations, etc. have been described for use with disclosed embodiments, others besides those disclosed can be utilized without exceeding the scope of the claimed inventions.

Persons of ordinary skill in the relevant arts will recognize that the subject matter hereof can comprise fewer features than illustrated in any individual embodiment described above. The embodiments described herein are not meant to be an exhaustive presentation of the ways in which the various features of the subject matter hereof can be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim can refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

The invention claimed is:

1. A system comprising:

a smart textile conformed on at least a portion of a surface of a set of headphones or a loudspeaker, the smart textile being configured to detect at least one input and comprising at least one of:

(i) electromechanical sensing fibers configured to detect mechanical input to the smart textile; or (ii) acoustic or vibrational sensing fibers configured to detect a sound-field change or a vibrational pressure pattern input to the smart textile, wherein the smart textile is configured to generate at least one signal in response to the detected at least one input; and at least one processor communicatively coupled to the smart textile and configured to:

receive the at least one signal from the smart textile;

process the received at least one signal to identify at least one characteristic associated with the at least one input; and based on the identified at least one characteristic, cause a change associated with the set of headphones or the loudspeaker.

2. The system of claim 1, wherein the at least one processor is arranged within the set of headphones or the loudspeaker.

3. The system of claim 1, wherein the at least one processor is external to the set of headphones or the loudspeaker.

4. The system of claim 1, wherein the at least one processor is configured to process the at least one signal using at least one of artificial intelligence or machine learning.

5. The system of claim 1, wherein causing the change associated with the set of headphones or the loudspeaker further comprises causing a type or degree of change based on the at least one characteristic.

6. The system of claim 1, wherein causing the change associated with set of headphone or the loudspeaker further comprises causing at least one of a change in an operating state, a change in an output characteristic, or an output of a prompt to a user.

7. The system of claim 6, wherein the change in the output characteristic is a change to an active noise canceling (ANC) mode or setting.

8. The system of claim 1, wherein the smart textile comprises at least one of:
(iii) physiological sensing elements configured to detect at least one of a pulse, a body vibration, a skin-conductivity signal, a temperature, or an electromyographic signal;
(iv) optical sensing fibers configured to detect optical input to the smart textile;
(v) inertial or orientation sensing elements including at least one of an accelerometer, gyroscope, magnetometer, or inertial measurement unit; or
(vi) environmental sensing elements configured to detect at least one of temperature, humidity, atmospheric pressure, airflow, wind, proximity, or elevation.

9. The system of claim 1, wherein the at least one characteristic comprises at least one of:
(i) a magnitude or intensity of pressure, force, deformation, stress, or inter-fiber pressure;
(ii) a spatial distribution or spatial pattern of pressure or force across the smart textile;
(iii) a temporal pattern, vibration pattern, gesture pattern, or similarity of a detected pattern to a trained pattern;
(iv) a fit or acoustic-interface characteristic of the set of headphones relative to a user;
(v) an anatomical or biometric characteristic of the user; or
(vi) an environmental or contextual characteristic associated with the set of headphones or a user of the set of headphones.

10. The system of claim 9, wherein at least one of:
(i) the spatial pattern corresponds to a grasp, stroke, push, pull, tap, slide, sweep, or traced trajectory;
(ii) the fit or acoustic-interface characteristic comprises at least one of an ear-cushion seal condition, ANC leakage condition, driver-to-ear-canal spacing, cavity size, or tightness or looseness of fit;
(iii) the anatomical or biometric characteristic comprises ear shape, head-related transfer function information, heart rate, pulse, voice vibration, muscle movement, skin conductivity, or user temperature; or
(iv) the environmental or contextual characteristic comprises wind, airflow, humidity, temperature, proximity, pose, orientation, or engagement state.

11. The system of claim 1, wherein to cause the change based on the identified at least one characteristic, the at least one processor is configured to:
continue playback of active audio output,
begin playback of audio output,
pause playback of active audio output,
prompt a user whether to pause or continue active audio output, turn off the set of headphones,
maintain a wireless communication connection with another device and pause playback of the active audio output,
adjust a volume of the active audio output, unlock a user device, enter text, adjust equalization settings, or
prompt a user to adjust a fit of the set of headphones.

12. The system of claim 1, wherein to cause the change based on the identified at least one characteristic, the at least one processor is configured to:
determine a use state of the set of headphones based on the identified at least one characteristic, wherein the use state comprises at least one of: actively worn, partially removed, fully removed, being held by a user, a fit of the set of headphones on the user, or placed on a surface; and
cause the change based on the determined use state.

13. The system of claim 1, wherein to cause the change based on the identified at least one characteristic, the at least one processor is configured to:
determine a user voice command or a user gesture based on the identified at least one characteristic; and
cause the change based on the determined user voice command or user gesture.

14. The system of claim 1, wherein to cause the change based on the identified at least one characteristic, the at least one processor is configured to:
identify a user or a user mood based on the identified at least one characteristic; and
cause the change based on the identified user or user mood.

15. The system of claim 1, wherein the at least one processor is further configured to:
detect an emergency based on the identified at least one characteristic; and
automatically alert at least one of: an emergency contact or an authority based on the detected emergency.

16. The system of claim 1, wherein the smart textile comprises a multimodal sensor configured to detect a plurality of different inputs.

17. A method comprising:
detecting, by a smart textile conformed on at least a portion of a surface of a set of headphones or a loudspeaker, at least one input including at least one of:
(i) mechanical input to the smart textile by one or more electromechanical sensing fibers of the smart textile; or
(ii) a sound-field change or a vibrational pressure pattern input to the smart textile by one or more acoustic or vibrational sensing fibers of the smart textile;
generating at least one signal by the smart textile in response to the detected at least one input;
processing, by at least one processor of the set of headphones or the loudspeaker, the at least one signal to identify at least one characteristic associated with the at least one input; and
based on the identified at least one characteristic, causing a change associated with the set of headphones or the loudspeaker.

18. The method of claim 17, wherein causing the change comprises at least one of: changing an operating state of the set of headphones or the loudspeaker, changing an audio output characteristic of the set of headphones or the loudspeaker. or initiating a prompt to a user.

19. The method of claim 17, wherein the at least one input to the smart textile further includes at least one of; pressure, deformation, temperature, a change in a magnetic field, a change in an electric field, or humidity.

20. A set of headphones comprising:
a smart textile conformed on at least a portion of a surface of the set of headphones, the smart textile being configured to detect at least one input and comprising at least one of:
(i) electromechanical sensing fibers configured to detect mechanical input to the smart textile; or
(ii) acoustic or vibrational sensing fibers configured to detect a sound-field change or a vibrational pressure pattern input to the smart textile, wherein the smart textile is configured to generate at least one signal in response to the detected at least one input; and at least one processor communicatively coupled with the smart textile and configured to:

receive the at least one signal from the smart textile related to the detected at least one input;

process the at least one signal to identify at least one characteristic associated with the at least one input; and based on the identified at least one characteristic, cause a change associated with the set of headphones.

21. A speaker comprising:

a smart textile conformed on at least a portion of a surface of the speaker, the smart textile being configured to detect at least one input and comprising at least one of:

(i) electromechanical sensing fibers configured to detect mechanical input to the smart textile; or (ii) acoustic or vibrational sensing fibers configured to detect a sound-field change or a vibrational pressure pattern input to the smart textile, wherein the smart textile is configured to generate at least one signal in response to the detected at least one input; and at least one processor communicatively coupled with the smart textile and configured to:

receive the at least one signal from the smart textile related to the detected at least one input;

process the at least one signal to identify at least one characteristic associated with the at least one input; and based on the identified at least one characteristic, cause a change associated with the speaker.

* * * * *